(12) United States Patent
Bretschneider et al.

(10) Patent No.: US 12,547,156 B2
(45) Date of Patent: Feb. 10, 2026

(54) METHOD OF PRODUCTION FOR TAMPER-PROOF MACHINE COMPONENTS

(71) Applicant: Siemens Aktiengesellschaft, Munich (DE)

(72) Inventors: Jochen Bretschneider, Owingen (DE); Björn Frerking, Nuremberg (DE); Guido Seeger, Baiersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 444 days.

(21) Appl. No.: 18/023,043

(22) PCT Filed: Jul. 5, 2021

(86) PCT No.: PCT/EP2021/068447
§ 371 (c)(1),
(2) Date: Feb. 24, 2023

(87) PCT Pub. No.: WO2022/042914
PCT Pub. Date: Mar. 3, 2022

(65) Prior Publication Data
US 2023/0305535 A1    Sep. 28, 2023

(30) Foreign Application Priority Data
Aug. 31, 2020  (DE) .......................... 102020006772.7

(51) Int. Cl.
*G05B 19/418*    (2006.01)
*G06K 19/06*    (2006.01)

(52) U.S. Cl.
CPC ... *G05B 19/4183* (2013.01); *G06K 19/06159* (2013.01); *G05B 2219/49302* (2013.01)

(58) Field of Classification Search
CPC ...... G05B 19/4183; G05B 2219/49302; G06K 19/06159
See application file for complete search history.

(56) References Cited

U.S. PATENT DOCUMENTS 5,974,150 A * 10/1999 Kaish ................... G06K 19/086
                                                    713/168
2014/0139608 A1 * 5/2014 Rosario ................ B23K 26/359
                                                    347/225

(Continued)

FOREIGN PATENT DOCUMENTS

CN    103649991    3/2014
CN    104636939    5/2015

(Continued)

OTHER PUBLICATIONS

PCT International Search Report dated Nov. 12, 2021 based on PCT/EP2021/068447 filed Jul. 5, 2021.
Wikipedia: "Prüfziffer"; Bearbeitungsstand Jan. 29, 2021.

*Primary Examiner* — Gary Collins
(74) *Attorney, Agent, or Firm* — Cozen O'Connor

(57) ABSTRACT

A method for producing a machine component from a workpiece includes registering a dimension of a surface of the workpiece to be machined and a margin of tolerance of the dimension, generating a signature pattern for the surface to be machined, shaping the workpiece at least on the surface to be machined, where a signature pattern is simultaneously produced during the shaping, and producing a check code on the workpiece, where the signature pattern has maximum dimensions that are within the tolerance margin.

16 Claims, 4 Drawing Sheets

(56) References Cited

U.S. PATENT DOCUMENTS

2014/0219541 A1    8/2014  Noyel et al.
2018/0012311 A1*  1/2018  Small ................... G06Q 20/389
2019/0278878 A1*  9/2019  Sawyer ................ G06F 21/602

FOREIGN PATENT DOCUMENTS

| CN | 110253148 | 9/2019 |
| DE | 102012006958 | 10/2013 |
| EP | 3340213 | 6/2018 |
| EP | 3696630 | 8/2020 |
| WO | 2014206476 | 12/2014 |

* cited by examiner

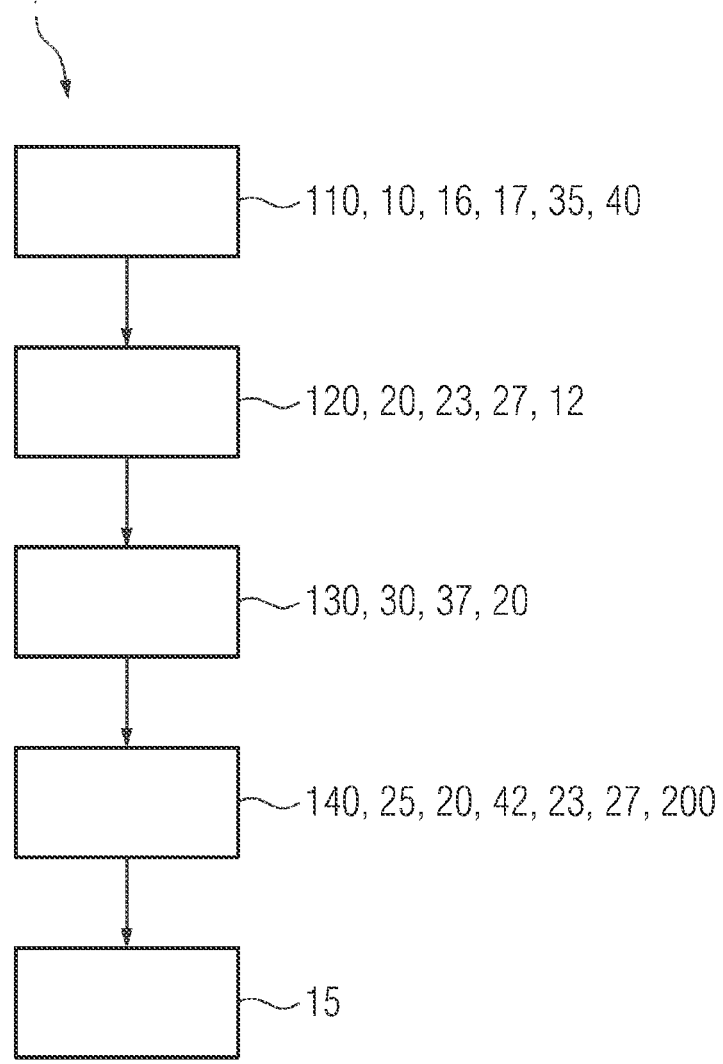

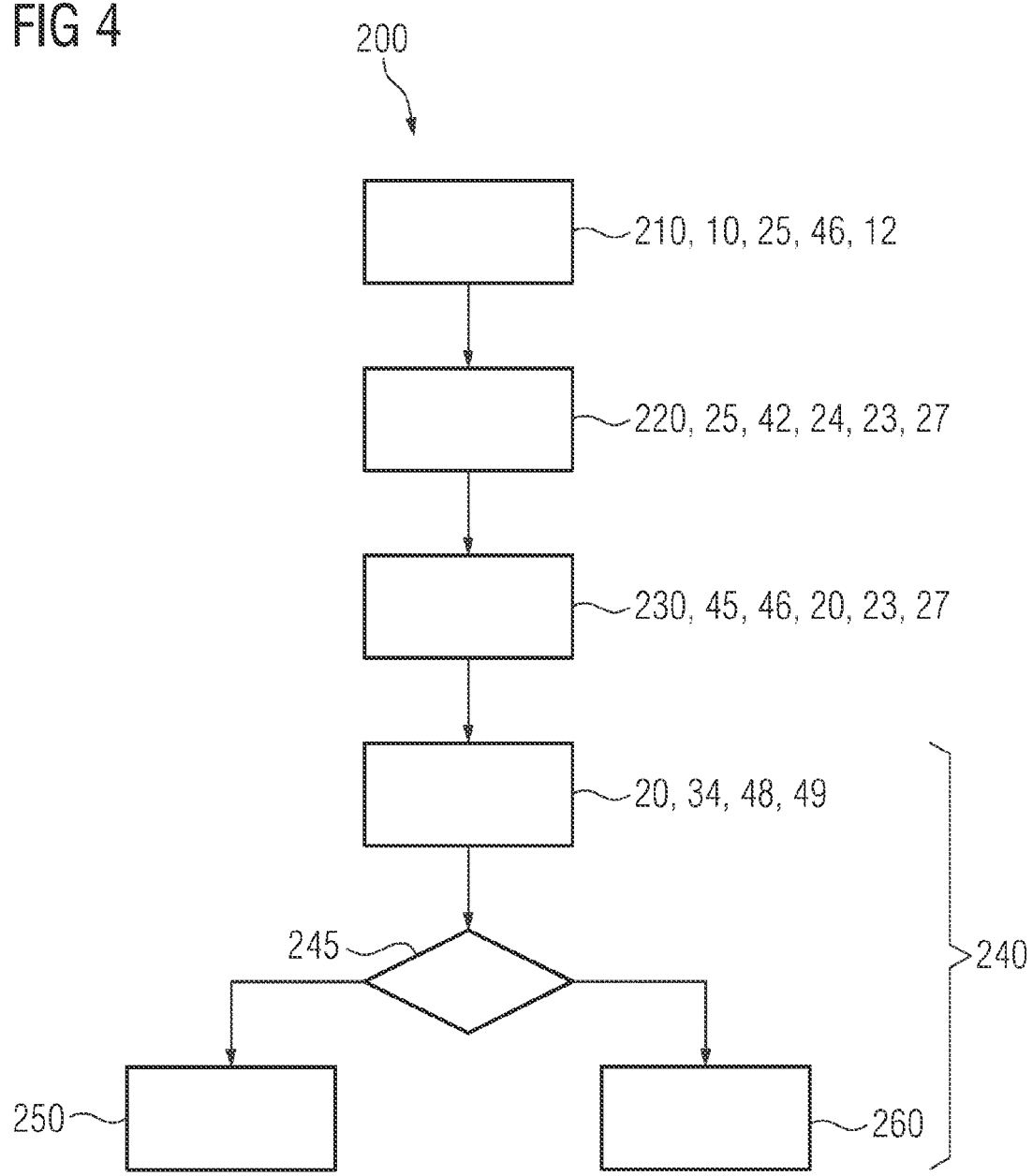

METHOD OF PRODUCTION FOR TAMPER-PROOF MACHINE COMPONENTS

CROSS-REFERENCE TO RELATED APPLICATIONS

This is a U.S. national stage of application No. PCT/EP2021/068447 filed 5 Jul. 2021. Priority is claimed on German Application No. DE1020006772.7 filed 31 Aug. 2020, the content of which is incorporated herein by reference in its entirety.

BACKGROUND OF THE INVENTION

1. Field of the Invention

The invention relates to a method for producing machine components, for which protection against forgery is sought, relates to a method for checking the authenticity of corresponding machine components, relates to a machine component produced via the methods and a computer program product for corresponding control of a machine tool, and relates to a control unit for a machine tool, which has such a computer program product available.

2. Description of the Related Art

Chinese patent application CN 110253148 A discloses a method in which workpieces are lasered to thus generate a surface identifier. The laser is actuated with random operating parameters, so a correspondingly configured surface identifier is generated. This in turn constitutes a de facto unique identification feature.

In a large number of fields of application, security-relevant machine components are used, via which critical functions are provided and which are highly regulated in many cases. At the same time, unauthorized suppliers occur in a lot of these fields of application, who place imitations of such machine components on the market. This is the case, for example, with aviation-approved components.

SUMMARY OF THE INVENTION

In view of the foregoing it is therefore an object of the invention to provide for a way to reliably distinguishing unauthorized imitations from legitimate machine components. It is simultaneously an object and aspiration to implement technical measures that are suitable for this simply and cost-efficiently. The invention is based on the object of providing a technical solution, which offers an improvement in at least one of the outlined points.

These and other objects and advantages are achieved in accordance with the invention by a method for producing a machine component whose authenticity has to be verifiable. The method starts from a workpiece, which is to be processed to form the machine component, and which is to be provided at the beginning of the method. The method comprises a first step in which a dimensioning of a surface of the workpiece to be machined is registered. For this, CAD information about the machine component, for example, can be read out and/or a parts program of a machine tool can be evaluated. The dimensioning can be formed as any detail, which relates to a property of the workpiece that can be permanently changed by the machining, such as a length specification, a surface roughness, a wave texture, a planarity, a radius, and/or an angle. An associated margin of tolerance is also registered with the dimensioning. The margin of tolerance can be ascertained analogously to the dimensioning and/or can be ascertained from general tolerance specifications for machine components to be produced. The margin of tolerance specifies a scope, which can be used for a signature pattern.

The signature pattern for the surface to be machined is generated in a second step. The signature pattern is individualized, for example, per workpiece or per workpiece batch. The signature pattern is a deviation of the surface to be produced from a nominal size, which is specified by the dimensioning registered in the first step. For this, the signature pattern can be formed, for example, as a relief. The signature pattern is an identification feature by which the authenticity of the machine component can be checked. In a third step, shape-giving machining of the workpiece occurs at least on the surface to be machined, where this surface is to be brought to the dimensioning registered in the first step. The signature pattern is also produced on the surface to be machined in the process. The signature pattern is accordingly embedded in the machine component in one of its contours.

The method also comprises a fourth step in which a check code is ascertained and the workpiece is provided with it. The check code is applied to the workpiece during the course of shape-giving machining at a location that can be read out. Inventively, the signature pattern, which is formed on the workpiece, has maximum dimensions, which lie within the margin of tolerance. The signature pattern has reduced dimensions thereby and can only be laboriously discovered as a result. Furthermore, the margin of tolerance is still maintained at the corresponding surface of the machine components, so they can be produced with uniform quality. The signature pattern and the check code allow the authenticity of the machine component, which is to be produced from the workpiece, to be checked. The steps of the method can be implemented sequentially or at least partially simultaneously.

In one embodiment of the inventive method, the shape-giving machining of the workpiece comprises cutting. Cutting can be performed, for example, with machine tools, which offer an increased degree of fabrication precision. The cutting can be, for example, milling, turning, drilling, or a combination hereof. The signature pattern can thus be precisely produced, for example by a milling tool, whereby the signature pattern can in turn be clearly registered during an authenticity check. The inventive method is accordingly suitable for performing a reliable authenticity check of the machine components. Alternatively or in addition, the shape-giving machining can also be formed as an additive fabrication, for example 3D print, or as an ablative fabrication, such as etchings or laser cutting.

Furthermore, the check code in the inventive method can be generated as a function of the signature pattern. For this, the signature pattern can be selected and used as input values for an algorithm, which generates from this an associated check code to be produced. This produces a mathematically comprehensible correlation between the signature pattern and the check code. A verification database, which logs each signature pattern and the associated check code, is therefore dispensable. Similarly, check codes can be generated during fabrication of the machine components. The inventive method allows a decentral authenticity check to be performed for correspondingly produced machine components. Consequently, the inventive method is scalable with reduced effort to substantially any number of machine components, opening up a broad range of applications.

Furthermore, the check code can be specified at least partially based on the signature pattern in combination with a private key. A private key should be understood within the context of an asymmetric cryptosystem. A check code can thus be generated, starting solely from which the signature pattern can be mathematically inferred only with enormous effort. Unauthorized production of a new pair with a check code and a consistent signature pattern becomes difficult thereby. The inventive method thus allows the technical benefits of an asymmetric cryptosystem to be used for the production of machine components. Alternatively or in addition, the check code can also be generated based on the signature pattern in combination with a private algorithm. A private algorithm should in this case be taken to mean, corresponding to a private key, a generation algorithm for the check code, to which only authorized users of the inventive method have access. The private algorithm can exhibit a high degree of complexity, whereby unauthorized attempts to reconstruct it become even more difficult. As a further alternative or in addition, a private key and a private algorithm can also be used jointly in combination with the signature pattern to generate the check code.

In a further embodiment of the inventive method, the signature pattern can be formed as a discrete relief and/or as a wave texture on the surface of the workpiece. A discrete relief, for example, a striped pattern or a mosaic pattern, offers a broad spectrum of possible signature patterns, so the method can be applied without repetition to a high number of workpieces. Discrete reliefs can be exactly registered optically, further increasing the reliability in the sought authenticity check. Similarly, only a limited portion of the spectrum of potential signature patterns thus possible can be used. The probability of an unauthorized supplier of imitations divining a permissible signature pattern is reduced thereby. This further increases the significance of an authenticity check of a corresponding machine component. Alternatively or in addition, the signature pattern can be formed as a wave texture on the surface of the workpiece. In order to serve as a signature pattern the wave texture can be varied, for example, as regards frequency, amplitude and/or the number of waves. Purposefully generated wave textures can be distinguished on a surface from randomly occurring wave textures only with great effort. A signature surface formed as a wave texture is consequently hard for an unauthorized supplier to discover, making any attempt to imitate the claimed method even more difficult. Overall, the inventive method is thus strengthened by a steganographic component.

In accordance with the inventive method, the check code can also be generated based on an adjustable item of additional information. The additional information can be generated, for example, by a user or an algorithm. This can be a character string, which can be used as an additional input, for example, for the private key and/or the private algorithm. In particular, the adjustable item of additional information can comprise details about the machine component itself, for example, its name, serial number, manufacturer, date of manufacture, place of manufacture, the original order giver, or the description of the original order to which the machine component belongs. Information can be stored thereby, which allows a starting point for tracking the machine component. This allows the cryptographic security obtained by the signature pattern and the check code to be increased further by way of validation.

Furthermore, the check code can be specified, i.e., generated, via a hash function, also called a trapdoor function. A hash function is mathematically not uniquely reversible and surjective. Accordingly, the corresponding signature pattern can only be inferred from a check code with enormous effort. Unauthorized reproduction of the inventive method is made more difficult thereby too.

In a further embodiment of the inventive method, the at least one surface, which is to be provided with the signature pattern, is randomly selected. A random position of the signature pattern on the surface of the workpiece is selected, for example, via a random generator. This comprises both selecting a position on a particular surface, for example, an end face or a generated surface, as well as selecting which surface of the workpiece is to be provided with the signature pattern. Even an intensive study of authorized machine components does not supply an unauthorized supplier with any robust starting point as to how the inventive method could therefore be imitated. The inventive method is thus strengthened by an aleatoric component. Overall, the security, which is offered by the inventive method, is thus expanded further.

Furthermore, a plurality of surfaces of the workpiece can also be selected in the inventive method. At least one signature pattern respectively can be produced on these surfaces. This makes imitation of a correspondingly produced component more difficult. The technical benefits of the inventive method are expanded further by the use of a plurality of surfaces with signature patterns. Alternatively or in addition, at least one dummy signature pattern can also be produced on a surface of the workpiece. A dummy signature pattern is taken to mean a signature pattern that does not have any function for checking the authenticity of the machine component, but in its design is generically identical to the at least one signature pattern used. To an observer, the signature pattern used and a dummy signature pattern cannot be readily distinguished. The dummy signature pattern can be easily created, for example, via a random generator. An unauthorized supplier, who is seeking to imitate the inventive method, will thereby be confronted with a large number of signature patterns to be decoded, and thus their time and effort will be increased.

In accordance with the inventive method the check code can be formed as a character string, a geometric pattern and/or a transmissible tag. A character string or a geometric pattern can be produced permanently and in a tamper-proof manner by shape-giving machining of the workpiece. The check code can be produced in particular in regions of the workpiece, which are subjected to reduced wear during operation as a machine component. Even after an increased operating time of the machine component, it is still possible to reliably check its authenticity. Transmissible tags, such as RFID tags, allow complex check codes to be permanently stored easily and compactly. The inventive method can consequently be adjusted to different areas of application.

The underlying objects of the invention are also achieved by an inventive method for checking the authenticity of a machine component, which is provided with a check code. The method assumes that the machine component is provided and a check code is registered in a first step. The check code is formed on a surface of the machine component and can be registered by machine, for example, optically or electromagnetically. A second step occurs in which the check code is decrypted by a public key and/or public algorithm. It is thereby possible to ascertain how an expected signature pattern on the surface of the machine components should be formed. For this purpose, a mathematical description of the expected signature pattern is generated from the check code during decryption. This comprises a geometric description of a relief and/or a wave texture, from which the signature pattern can be formed.

In a third step, the signature pattern on the surface of the machine component is registered, for example, by optical registering via a camera. A fourth step comprises comparing the signature pattern registered on the surface of the workpiece with the expected signature pattern, which is ascertained in the third step from the check code. The authenticity of the machine component is identified based on the comparison if the registered signature pattern matches the expected signature pattern. Inauthenticity of the machine component is identified if the registered signature pattern deviates from the expected signature pattern. The result of the comparison is also output to a user. The third and fourth steps can also be performed because representative values, for example, a hash value, are used for the check code and/or the signature pattern. The inventive method can be implemented quickly and allows the authenticity or inauthenticity of the machine component to be reliably identified. The check code and the signature pattern are retained even after sustained wear-prone operation of the machine component. The method requires only registering of the signature pattern and of the check code and can therefore be implemented decentrally, i.e., without connection to a central instance. In one embodiment of the inventive method, the signature pattern can be produced by a production method in accordance with the disclosed embodiments. An increased degree of security can be achieved in the authenticity check thereby and for machines, which use the checked machine component, the operating security against unauthorized imitations can be enhanced.

Similarly, the objects in accordance with the invention are achieved by an inventive machine component, which has a surface on which a signature pattern is formed. The machine component is also provided with a check code, which can be used in conjunction with the signature pattern for an authenticity check. Inventively, the machine component is produced in accordance with the above-described embodiments of the production methods.

Furthermore, the objects in accordance with the invention are achieved by an inventive computer program product. The computer program product is configured to receive and evaluate measurement data and thus register a dimension of a surface of a workpiece. The computer program product can be configured, for example, to receive and process image data of a camera. The computer program product is also configured to ascertain a signature pattern for the surface of the workpiece, to generate it, therefore. Furthermore, the computer program product is configured to provide control commands for a machine tool, with which the workpiece is to be machined. Inventively, the computer program product is configured to implement at least one embodiment of the disclosed embodiments of the production method. Within the context of this, the computer program product is at least capable of generating a signature pattern with which the workpiece is to be provided, and generating control commands with which the signature pattern can be produced. The computer program product can be executed via a computing unit and a memory of a control unit of a machine tool. For this purpose, the computer program product can be formed at least partially as software and/or hardwired, as a chip, integrated circuit, FPGA or the like. The computer program product can be configured in a monolithic manner, can unify all of its functions and can be executed on a hardware platform. Alternatively, the computer program product can also be formed in a modular manner and can comprise sub-programs, which achieve individual functions separately respectively or in a communicative exchange of data. A modular computer program product can accordingly be executed on different hardware platforms, which communicate at least temporarily with each other. This also comprises, for example, a sub-program, which is executed on a higher-order control unit outside of a machine tool, such as a central computer or a computer Cloud, and with another sub-program, which interacts in a control unit in the machine tool.

Furthermore, the objects and advantages are achieved in accordance with the invention by an inventive control unit, which is configured for use in a machine tool. The machine tool is configured to cut a workpiece, which is to be processed further by cutting to form a machine component. The control unit is configured to control the cutting via the machine tool and is equipped for this with a computer program product. This computer program product is configured in accordance with one of the disclosed embodiments.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be explained in more detail in figures below with reference to individual embodiments. It should be gathered from the figures that they complement each other to the extent that the same reference numerals have the same technical meaning in different figures. The features of the individual embodiments can also be combined among themselves. Furthermore, the embodiments shown in the figures can be combined with the features outlined above, in which:

FIG. 3 schematically shows a sequence of a third embodiment of the claimed production method;

FIG. 4 schematically shows a sequence of a first embodiment of the claimed authentication method.

DETAILED DESCRIPTION OF THE EXEMPLARY EMBODIMENTS

Figure 1:
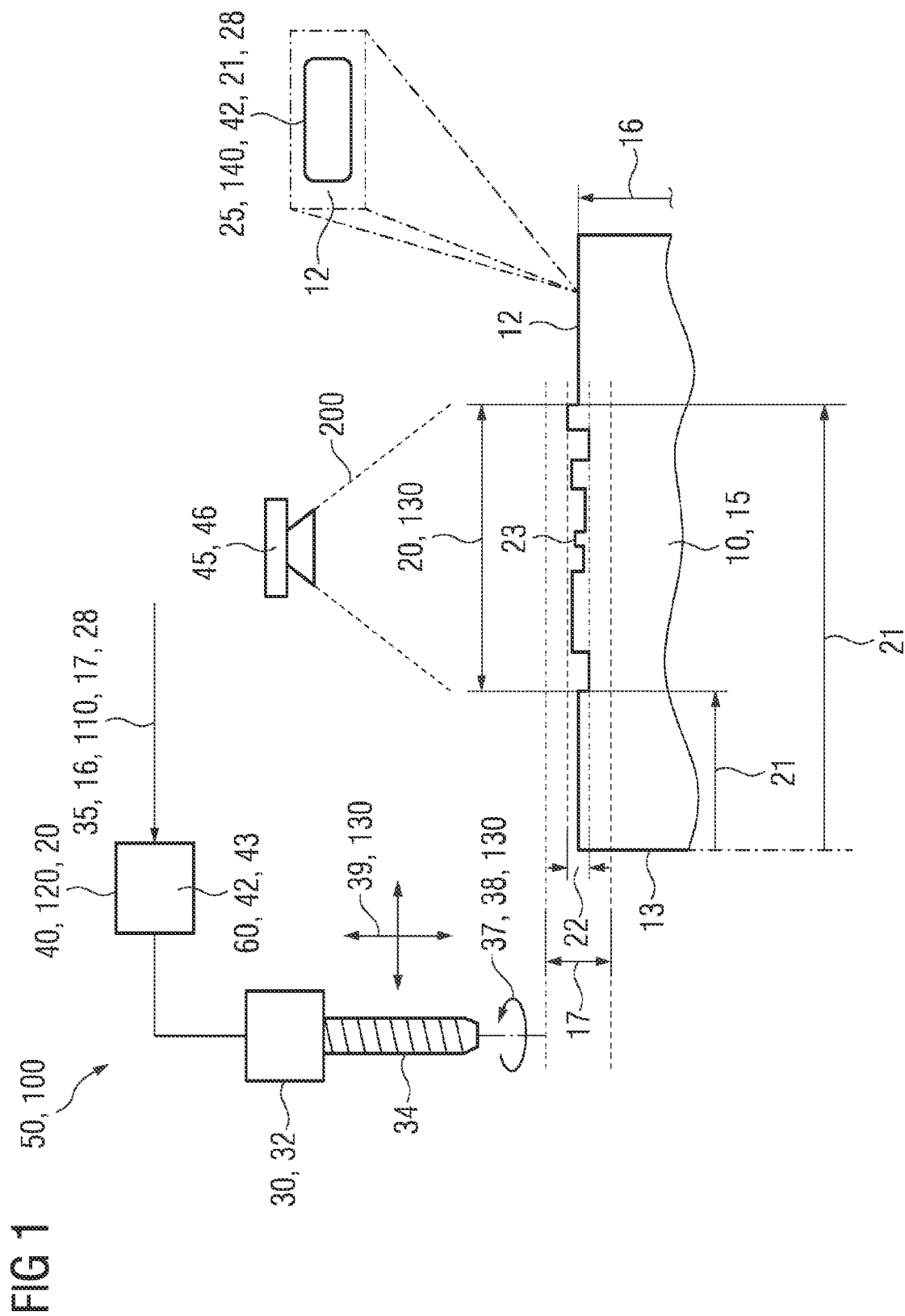
FIG. 1 schematically shows a workpiece that is machined in a production method in accordance with a first embodiment.

FIG. 1 depicts in a sectional longitudinal view a workpiece 10, which is machined with a first embodiment of the production method 100. The workpiece 10 is to be processed further thereby to form a machine component 15. The method 100 assumes that the workpiece 10 is provided and can be machined in a shape-giving manner by a tool 30. The tool 30 comprises a milling tool 34, which can be driven by a drive means 32 to implement shape-giving machining 37. Here, the shape-giving machining 37 comprises cutting 38. In a first step 110 of the method 100, a dataset 35 is provided, which comprises at least one dimensioning 16. The shape-giving machining 37 of the workpiece 10, in order to produce the machine component 15, is yielded by the dimensioning 16. The dimensioning 16 thus describes a finished size of the machine component 15. The dataset 35, via which the dimensioning 16 is provided, comprises a detail about a margin of tolerance 17 of the dimensioning 16. The margin of tolerance 17 can be indicated via absolute values or can be derived from a detail about a tolerance category. The dimensioning 16 and the margin of tolerance 17 are made available to a control unit 40 of a machine tool 50 (not represented), which is configured to process it further. In a second step 120, a signature pattern 20 is generated, which is to be formed on the workpiece 10 and the result of which is represented in FIG. 1.

The inventive method 100 for producing the machine component 15 comprises a third step 130 in which the shape-giving machining 37 is performed and during which the signature pattern 20 is produced. The signature pattern 20 is formed as a relief 23, which is provided on the surface 12 of the workpiece 10. The signature pattern 20 can be read out or registered by machine in a manner individual to the workpiece or batch. The relief 23 is produced during the third step 130 by a fabrication movement 39 of the milling tool 34. Furthermore, the relief 23 in FIG. 1 can be registered with a registering device 45, which is formed as a camera 46, in order to thus perform an authenticity check method 200 (not represented in further detail). Furthermore, the method 100 for producing the machine component 15 comprises a fourth step 140 in which a check code 25 is produced on the surface 12 of the workpiece 10. The check code 25 can also be read out or registered by machine analogously to the signature pattern 20. The registering device 45 is configured to register the check code 25. The check code 25 is generated in the fourth step 140 based on the signature pattern 20 via a private key 42 and a private algorithm 43 and thus depicts the signature pattern 20 in encrypted form. Similarly, the check code 25 comprises information about the position 21 of the signature pattern 20, which is represented in FIG. 1 relative to a reference edge 13, which is also encrypted. Similarly, the check code 25 comprises at least one adjustable item of additional information 28 which, together with the dataset 35, can be specified by a user input and is likewise encrypted in the check code 25. The additional information 28 allows, for example, by indicating a manufacturer, date of manufacture, place of manufacture, an original order giver, or a description of the original order to which the machine component belongs, the authenticity of that component to be verified further.

The signature pattern 20 formed as a relief 23 has maximum dimensions 22, which describe the highest and lowest regions of the relief 23. The maximum dimensions 22 are oriented in the same direction as the dimensioning 16 and its margin of tolerance 17. The signature pattern 20 is enveloped along the direction of the dimensioning 16 by its maximum dimensions 22. In accordance with the inventive method 100, the signature pattern 20 has maximum dimensions 22, which lie within the margin of tolerance 17. There is no significant change on the surface 12 thereby for the further operating behavior or assembly behavior of the machine component 15. As a result, the signature pattern 20 has small dimensions and cannot be readily discovered by an unauthorized supplier without prior knowledge hereof. The fabrication precision necessary for producing the signature pattern 20 is typically provided by current machine tools 50. Producing the signature pattern 20 is thus possible with capabilities of the machine tool 50, which exist anyway. The signature pattern 20 can consequently be easily produced and is also durable over an increased operating time of the machine component 15. In order to perform the method 100 for producing the machine component 15 from the workpiece 10, the control unit 40 is equipped with an appropriately configured computer program product 60.

Figure 2:
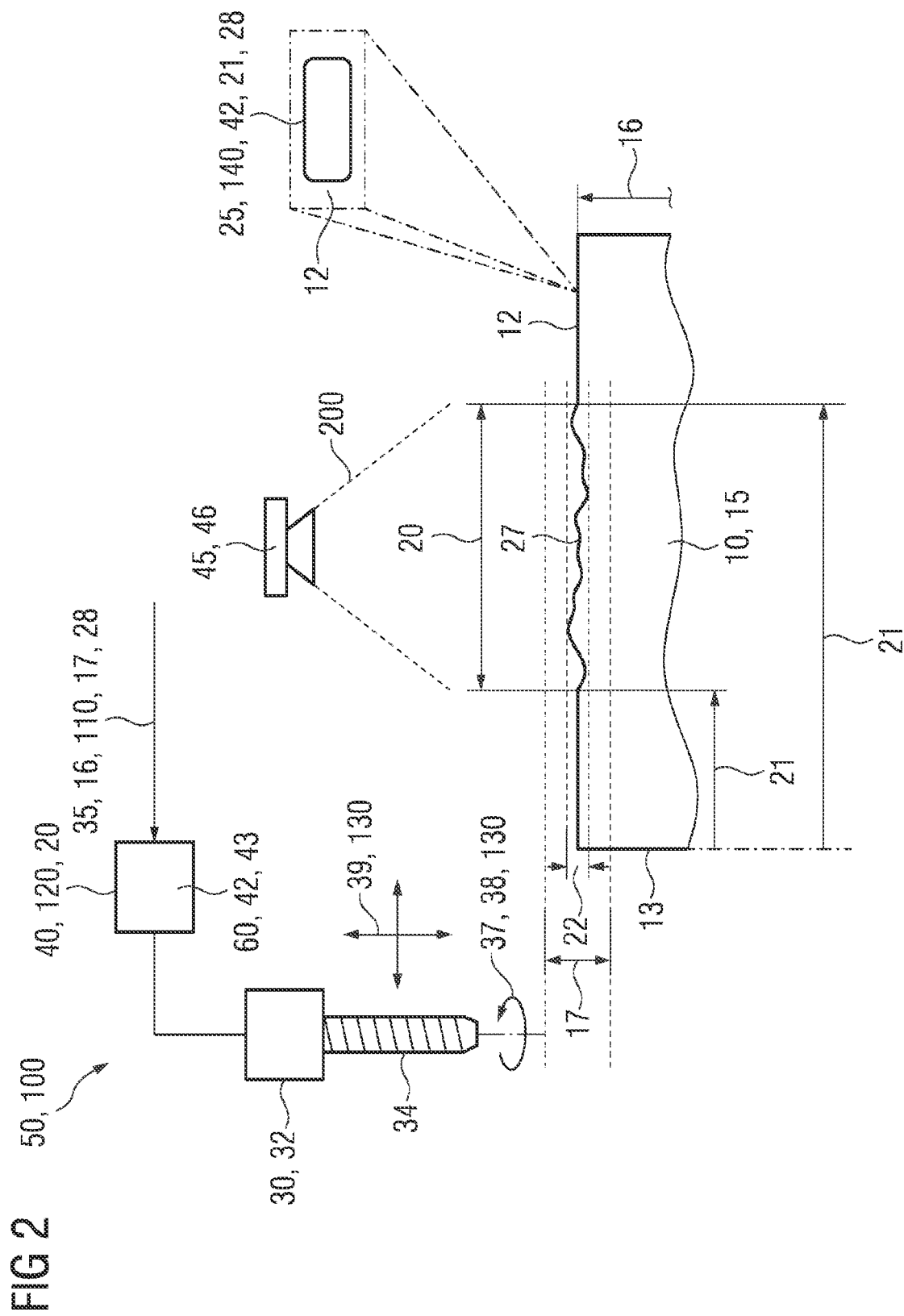
FIG. 2 schematically shows a workpiece that is machined in a production method in accordance with a second embodiment.

In a sectional longitudinal view, FIG. 2 depicts a workpiece 10, which is machined with a second embodiment of the inventive production method 100. The workpiece 10 can be processed further thereby to form a machine component 15. The method 100 assumes that the workpiece 10 is provided and can be machined in a shape-giving manner by a tool 30. The tool 30 is comprises a milling tool 34, which can be driven by a driver 32 to perform shape-giving machining 37. Here, the shape-giving machining 37 comprises cutting 38. In a first step 110 of the method 100, a dataset 35 is provided, which comprises at least one dimensioning 16. The shape-giving machining 37 of the workpiece 10, in order to produce the machine component 15, is yielded by the dimensioning 16. The dimensioning 16 thus describes a finished size of the machine component 15. The dataset 35, via which the dimensioning 16 is provided, comprises a detail about a margin of tolerance 17 of the dimensioning 16. The margin of tolerance 17 can be indicated by absolute values or derived from a detail about a tolerance category. The dimensioning 16 and the margin of tolerance 17 are made available to a control unit 40 of a machine tool 50 (not represented), which is configured to process it further. In a second step 120, a signature pattern 20 is generated, which is to be formed on the workpiece 10 and the result of which is represented in FIG. 2.

The inventive method 100 for producing the machine component 15 comprises a third step 130 in which the shape-giving machining 37 is performed in which the signature pattern 20 is produced. The signature pattern 20 is formed as a wave texture 27, which is applied to the surface 12 of the workpiece 10. The signature pattern 20 can be read out or registered by machine in a manner individual to the workpiece or batch. The wave texture 27 is produced during the third step 130 by a fabrication movement 39 of the milling tool 34. Furthermore, the wave texture 27 in FIG. 2 can be registered with a registering device 45, which is formed as a camera 46, in order to perform an authenticity check method 200 (not represented in further detail). Furthermore, the method 100 for producing the machine component 15 comprises a fourth step 140 in which a check code 25 is produced on the surface 12 of the workpiece 10. The check code 25 can also be read out or registered by machine analogously to the signature pattern 20. The registering device 45 is configured to register the check code 25. The check code 25 is generated in the fourth step 140 based on the signature pattern 20 via a private key 42 and a private algorithm 43 and thus depicts the signature pattern 20 in encrypted form. Similarly, the check code 25 comprises information about the position 21 of the signature pattern 20, which is represented in FIG. 1 relative to a reference edge 13, which is also encrypted. Similarly, the check code 25 comprises at least one adjustable item of additional information 28 which, together with the dataset 35, can be specified by a user input and is likewise encrypted in the check code 25. The additional information 28 allows, for example, by indicating a manufacturer, date of manufacture, place of manufacture, an original order giver, or a description of the original order to which the machine component belongs, the authenticity of the component to be verified further.

The signature pattern 20 formed as a wave texture 27 has maximum dimensions 22, which describe the highest and lowest regions of the wave texture 27. The maximum dimensions 22 are oriented in the same direction as the dimensioning 16 and its margin of tolerance 17. The signature pattern 20 is enveloped by its maximum dimensions 22 along the direction of the dimensioning 16. In accordance with the inventive method 100, the signature pattern 20 has maximum dimensions 22, which lie within the margin of tolerance 17. There is no significant change on the surface 12 thereby for the further operating behavior or assembly behavior of the machine component 15. As a result, the signature pattern 20 has small dimensions and cannot be readily discovered by an unauthorized supplier without prior knowledge hereof. In particular, the wave texture 27 can at best be distinguished with great effort from a wave texture that establishes itself on the surface 11 of the workpiece 10 or machine component 15. The wave texture 27 achieves a steganographic component therewith, which increases the protection against forgery for the machine component 15. The fabrication precision necessary for producing the signature pattern 20 is typically provided by current machine tools 50. Producing the signature pattern 20 is thus possible with capabilities of the machine tool 50, which exist anyway. The signature pattern 20 can consequently be easily produced and is also durable over an increased operating time of the machine component 15. In order to performed the method 100 for producing the machine component 15 from the workpiece 10 the control unit 40 is equipped with an appropriately configured computer program product 60.

FIG. 3 shows the sequence of a third embodiment of the inventive method 100 for producing a machine component 15 from a workpiece 10. The method 100 assumes that the workpiece 10 is produced so it can be machined by a machine tool 50. In a first step 110, a dimensioning 16 of the workpiece 10 or the machine component 15 to be produced is provided by a dataset 35. A margin of tolerance 17 of the dimensioning is also provided with the dimensioning 16. The margin of tolerance 17 and the dimensioning 16 are made available in a form that can be processed further to a control unit 40 of the machine tool 50. A second step 120 follows in which a signature pattern 20 is generated, which is formed on a surface 12 of the workpiece 10 to be machined as a relief 23 and/or as a wave texture 27. The signature pattern 20 is individual to the workpiece or batch and can be registered by machine, i.e., read out. In a subsequent third step 130, shape-giving machining 37 of the workpiece 10 occurs with a tool 30 of the machine tool 50. The signature pattern 20 is produced at least on the surface 12 of the workpiece 10 to be machined in the process. The signature pattern 20 has maximum dimensions 22, which lie within the margin of tolerance 17, so a functionality of the machine component 15 is not affected by the signature pattern 20. In a fourth step 140, a check code 25 is produced, which is ascertained based on the signature pattern 20. For generating the check code 25, details that describe the signature pattern 20, for example, as a relief 23 and/or wave texture 27, are encrypted via a private key 42. The check code 25 can be registered by machine, in other words, read out, and can be compared in an authentication method 200 (not shown) with the signature pattern 20. The authenticity of the machine component 15 can be verified or falsified thereby.

After completion of the fourth step 140, the machined workpiece 10 is in the form of a machine component 15, which can be removed from the machine tool 50.

FIG. 4 represents the sequence of a method 200 for checking the authenticity of a machine component 15 in a first embodiment. The method 200 starts from a machine component 15, which is produced from a workpiece 10 and can be registered via at least one registering device 45. In a first step 210, a check code 25 is registered by the registering device 45, which code is formed on a surface 12 of the machine component 15. A second step 220 follows in which the check code 25 is decrypted and an expected signature pattern 24 is generated by decrypting. For the purpose of decrypting, a private key 42 is applied to the registered check code 25 and data is thus obtained, which mathematically describes, for example, a relief 23 and/or a wave texture 27. A third step 230 occurs in which, for example, via the registering device 45, a signature pattern 20 is registered, which is formed on the surface 12 of the machine component 15. For this, the registering device 45 can comprise, for example, a camera 46. Registering generates data, which mathematically describes the signature pattern 20 formed on the surface 12 in the form of a relief 23 and/or a wave texture 27. This is followed by a fourth step 240 in which the registered signature pattern 20 is compared with the expected signature pattern 24. The comparison 48 performed in this way can be implemented while taking into account an adjustable tolerable scope for deviation 49. In the fourth step 140, the comparison 48 produces a branch 245. If it is ascertained via the comparison that the expected signature pattern 20 matches the registered signature pattern 24, the authenticity 250 of the machine component 15 is identified. If it is ascertained via the comparison 48 that the expected signature pattern 24 deviates from the registered signature pattern 20, inauthenticity 260 of the machine component 15 is identified. Finally, the result of the comparison 48 is output to a user.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for producing a machine component from a workpiece, the method comprising:
 a) registering a dimensioning of a surface of the workpiece to be machined and a margin of tolerance of the dimensioning;
 b) generating a signature pattern for the surface to be machined;
 c) shape-giving machining of the workpiece at least on the surface to be machined, the signature pattern is being produced during said shape-giving machining; and
 d) producing a check code on the workpiece;
   wherein the signature pattern has maximum dimensions which lie within the margin of tolerance; and
   wherein the signature pattern is formed as a wave texture on the surface of the workpiece.

2. The method as claimed in claim 1, wherein the shape-giving machining comprises cutting.

3. The method as claimed in claim 2, wherein the method forms the check code as a function of the signature pattern respectively.

4. The method as claimed in claim 1, wherein the method forms the check code as a function of the signature pattern respectively.

5. The method as claimed in claim 4, wherein the check code is specified at least partially based on at least one of (i) the signature pattern and a private key and (ii) a private algorithm.

6. The method as claimed in claim 4, wherein the check code is generated based on an adjustable item of additional information.

7. The method as claimed in claim 5, wherein the check code is generated based on an adjustable item of additional information.

8. The method as claimed in claim 1, wherein the check code is specified via a hash function.

9. The method as claimed in claim 1, wherein the at least one surface, which is to be provided with the signature pattern, is randomly selected.

10. The method as claimed in claim 1, wherein at least one signature pattern respectively is produced on a plurality of surfaces of the workpiece.

11. The method as claimed in claim 1, wherein the check code is formed as at least one of (i) a character string, (ii) a geometric pattern and (iii) a transmissible tag.

12. The method as claimed in claim 1, wherein at least one dummy signature pattern is also produced on the surface of the workpiece.

13. A method for checking an authenticity of a machine component which is provided with a check code, the method comprising:
   a) registering the check code which is formed on a surface of the machine component;
   b) decrypting the check code and ascertaining an expected signature pattern;
   c) registering a signature pattern which is formed on the surface of the machine component; and
   d) identifying the authenticity of the machine component if the registered signature pattern matches the expected signature pattern, or identifying inauthenticity of the machine component if the registered signature pattern deviates from the expected signature pattern;
   wherein the signature pattern is produced via the method as claimed in claim 1.

14. A computer program product for registering a dimensioning on a surface of a workpiece and for ascertaining a signature pattern for a method for producing a machine component from the workpiece, wherein the method is performed as claimed in claim 1.

15. A control unit for a machine tool, which is configured for cutting a workpiece to form a machine component, wherein for controlling the cutting, the control unit is provided with the computer program product as claimed in claim 14.

16. A machine component, comprising:
   at least one surface upon which a signature pattern is formed and which is provided with a check code;
   wherein the signature pattern is produced by:
   a) registering a dimensioning of the at least one surface and a margin of tolerance of the dimensioning;
   b) generating the signature pattern for the at least one surface;
   c) shape-giving machining of a workpiece at least on the at least one surface, the signature pattern is being produced during said shape-giving machining; and
   d) producing the check code;
   wherein the signature pattern has maximum dimensions which lie within the margin of tolerance; and
   wherein the signature pattern is formed as a wave texture.

* * * * *